United States Patent [19]

Park et al.

[11] Patent Number: 4,707,388

[45] Date of Patent: Nov. 17, 1987

[54] HEAT-RECOVERABLE ARTICLE

[75] Inventors: George B. Park, Purton, Nr. Swindon; David J. Barker, Faringdon, both of England

[73] Assignee: Raychem Limited, London, England

[21] Appl. No.: 822,683

[22] Filed: Jan. 23, 1986

Related U.S. Application Data

[63] Continuation of Ser. No. 616,698, Jun. 13, 1984, abandoned, which is a continuation of Ser. No. 411,184, Aug. 25, 1982, abandoned.

[30] Foreign Application Priority Data

Sep. 14, 1981 [GB] United Kingdom ............... 8127629

[51] Int. Cl.$^4$ .......................... C09J 7/02; B05D 3/02
[52] U.S. Cl. ........................................ 428/36; 156/85; 156/86; 156/172; 427/375; 427/385.5; 427/386; 428/332; 428/337; 428/346; 428/347; 428/354; 428/355; 428/413; 428/913
[58] Field of Search ................. 428/347, 355, 348, 35, 428/36, 354, 349, 413, 913, 332, 337, 346; 427/385.5, 386, 375; 156/85, 86, 212, 172; 264/566; 403/28; 138/99; 525/112; 528/120

[56] References Cited

U.S. PATENT DOCUMENTS

| | | | |
|---|---|---|---|
| 2,027,962 | 1/1936 | Currie | 156/212 X |
| 3,086,242 | 4/1963 | Cook et al. | 264/566 |
| 3,243,211 | 3/1966 | Wetmore | 403/28 |
| 3,379,218 | 4/1968 | Conde | 138/99 |
| 3,530,898 | 9/1970 | Wilson | 138/99 |
| 3,542,079 | 11/1970 | Kelly | 156/172 X |
| 4,117,038 | 9/1978 | Lehmann et al. | 528/120 |
| 4,122,128 | 10/1978 | Lehmann et al. | 525/112 |
| 4,181,775 | 1/1980 | Corke | 428/348 |
| 4,271,329 | 6/1981 | Perelmuter | 156/85 X |
| 4,363,843 | 12/1982 | Crofts | 428/347 X |

FOREIGN PATENT DOCUMENTS

| | | | |
|---|---|---|---|
| 016247 | 1/1982 | European Pat. Off. | |
| 2156150 | 11/1971 | Fed. Rep. of Germany | |
| 55-23598 | 6/1980 | Japan | 428/355 |
| 770454 | 3/1957 | United Kingdom | |
| 793303 | 4/1958 | United Kingdom | 428/355 |
| 917090 | 1/1963 | United Kingdom | |
| 1104274 | 2/1968 | United Kingdom | 428/347 |
| 1126610 | 9/1968 | United Kingdom | 428/355 |
| 1229654 | 4/1971 | United Kingdom | 428/355 |
| 1370782 | 10/1974 | United Kingdom | |
| 1387241 | 3/1975 | United Kingdom | |
| 1411134 | 10/1975 | United Kingdom | 428/347 |
| 1440524 | 6/1976 | United Kingdom | 428/35 |
| 2019112 | 10/1979 | United Kingdom | 428/354 |
| 2023021 | 12/1979 | United Kingdom | 428/349 |
| 8123072 | 7/1981 | United Kingdom | 427/385.5 |
| 8123069 | 7/1981 | United Kingdom | 428/347 |
| 2076694 | 12/1981 | United Kingdom | 428/347 |
| 2083403 | 7/1984 | United Kingdom | |
| 2083859 | 11/1984 | United Kingdom | |

*Primary Examiner*—Thomas J. Herbert
*Attorney, Agent, or Firm*—Yuan Chao; Edith A. Rice; Herbert G. Burkard

[57] ABSTRACT

A dimensionally recoverable article, preferably a heat-recoverable article, has on at least part of a surface thereof an adhesive composition that will cure by reaction of a plurality of mutually reactive components. The components are in the form of particles which are mixed together and which will fuse when heated. Preferred adhesives are based on combinations of an epoxy with a polyamide, carboxylic acid, phenolic resin or blocked isocyanate curing agent.

The particulate adhesives show a synergistic increase in rate and/or level of cure when used in conjunction with a recoverable article.

14 Claims, No Drawings

HEAT-RECOVERABLE ARTICLE

This application is a continuation of application Ser. No. 616,698, filed June 13, 1984, now abandoned, which is a continuation of application Ser. No. 411,184, filed Aug. 25, 1982, now abandoned.

This invention relates to dimensionally-recoverable articles, especially dimensionally heat-recoverable articles and to adhesives suitable for use therewith.

A heat-recoverable article is an article the dimensional configuration of which may be made substantially to change when subjected to heat treatment.

Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962 and 3,086,242. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above a transition temperature thereof, for example, the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat to raise the temperature above the transition temperature will cause the article to assume its original heat-stable shape.

Where the term "recovery temperature" in connection with heat-recoverable articles is used herein, it is intended to refer to the transition temperature above which the article recovers even if some small degree of recovery is exhibited at temperatures slightly below the transition temperature.

In other articles, as described, for example, in British Pat. No. 1,440,524, an elastomeric member such as an outer tubular member is held in a stretched state by a second member, such as in inner tubular member, which, upon heating weakens and thus allows the elastomeric member to recover.

Articles of this type have, in recent years, bcome widely used in a number of applications, for example for protecting objects such as electrical cables and cable splices or metal pipes from corrosion or other damage, for example damage caused by penetration of moisture. For this reason many heat recoverable articles are provided with a coat of adhesive or sealant.

One problem that is associated with the provision of adhesives on heat-recoverable articles is that, because the heat required to melt or otherwise activate the adhesive is usually supplied by heating the external surface of the heat-recoverable article, the temperature to which the adhesive is heated will be considerably lower than that of the external surface of the article due to the relatively poor thermal conductivity of the materials from which the heat-shrinkable article is formed. Thus, for example, where the heat-shrinkable article is formed from a cross-linked polyethylene, the external surface of the article may be heated up to about 250° C. in order to raise the adhesive temperature to only 100° C., and, in this case, no further heating of the article would be possible without damaging the article. Also, in many cases, the maximum temperature to which the adhesive can be raised is restricted by the type of substrate that is being covered. For example, where the substrate is a metal pipe, the thermal conductivity and size of the pipe cause it to act as a heat-sink and effectively limit the adhesive temperature and, where the substrate comprises an uncrosslinked polymer as is often the case with electrical cable jackets, the adhesive temperature often cannot be raised above about 100° to 120° C. without damaging the cable jacket.

Whilst hot-melt adhesives or mastics can be used in a number of applications, the maximum temperature to which the article may be subjected after installation is usually limited to the melting or softening point of the adhesive.

The present invention provides a dimensionally recoverable article, preferably a dimensionally heat recoverable article, having, on at least part of a surface thereof, an adhesive composition that will cure by reaction of a plurality of mutually reactive components, the components existing separately from one another in the form of solid particles which are mixed together and which will fuse when heated.

Preferably the components are such that, if they are brought together into intimate contact for example by dissolving them in a common solvent, they will react together even at room temperature to form a cured product so that curing of the adhesive composition on the article during storage is prevented substantially solely by the separation of the particles of each component.

In a number of cases it has been found that when the heat-recoverable article according to the invention is recovered onto a substrate, the adhesive will cure sooner than it if is heated on its own to the same temperature, or will cure at a significantly lower temperature than it will when heated on its own. Thus it has been found that it is possible, according to the invention, to provide an adhesive coated heatrecoverable article in which the adhesive can be cured by heating the article to its recovery temperature for periods in the range of the recovery time of the article, but which will also have good storage life.

The rate of curing of curable adhesives at elevated temperatures is linked to their rate of curing at ambient temperatures, and hence their storage life, by the Arrhenius equation which effectively imposes a limit on the rate of cure of an adhesive at the usual recovery temperature of a heat-shrinkable article (about 100° to 120° C.) for any given storage life at ambient temperatures or vice versa. It can be shown from the Arrhenius equation that any curable adhesive that cures sufficiently rapidly at the recovery temperature of the article should suffer from a poor storage life or that an adhesive that does have a long storge life should not cure sufficiently rapidly at the recovery temperature of the article. However, according to the invention it is possible to overcome this problem by virtue of the synergistic increase in the rate of curing of certain adhesives when used in conjunction with a recoverable article.

This synergistic effect is most pronounced when the fusion temperature of the components is in the region of the recovery temperature of the article or the temperature to which the adhesive is heated when the article is recovered. Preferably the fusion temperature is not more than 50°, especially not more than 30° and most especially not more than 10° C. above the recovery temperature of the article. Also, not more than one, and especially none, of the components has a fusion temperature of less than 50° C. Each of the components preferably has a fusion temperature in the range of 70° to 120° C. and most preferably from 70° to 100° C., and, instead or in addition, each has a fusion temperature that differs from the fusion temperature of the or each other reactive component by not more than 30° C.

In most instances the components will melt or soften at their fusion temperature although the term is intended to include sublimation of one or more components if this occurs.

In many cases the reactive components will soften and flow or otherwise fuse over a temperature range and the softening characteristics of the components may be observed by thermomechnical analysis (TMA) as described in "Thermal Analysis" by T. Daniels published by Kogan Page 1973. Accordingly, the fusion temperature or the melting point of the reactive components of the adhesive is defined herein as being the temperature at which the TMA probe has penetrated to 60% of the total thickness of the material, usually referred to as $T_{60}$. The TMA data described herein were obtained using a 6.35 mm diameter flat profile probe loaded with a 50 gramme weight and by increasing the temperature of the material at a rate of 10° C. per minute. Preferably the temperature at which reactive components of the adhesive initially become soft referred to as $T_i$ on the TMA plot) is not more than 30° C. below and especially not more than 25° C. below the melting point ($T_{60}$) of the components so that the difference between the maximum storage temperature and the minimum curing temperature can be reduced as far as possible.

Another synergistic effect that may be shown by the articles according to the invention, either instead of or in addition to the increase in rate of cure of the adhesive is an increase in the level of curing of the adhesive as compared with the adhesive on its own. The increase in level of curing leads to improved properties such as solvent resistance and improved high temperature properties such as high temperature shear strength.

The level of cure of the adhesive may be measured in a number of ways. For example, it may be measured as an increase in the $T_{60}$ (as defined above) or, more preferably the $T_{80}$ of the adhesive, where $T_{80}$ is defined as the temperature at which the TMA probe has penetrated to 80% of the total thickness of the adhesive. In some cases the composition will cure sufficiently to prevent the probe penetrating it by 80% in which case the total depth of penetration is a better measure of cure. Another measure of the level of cure of the adhesive is its gel content which is measured by weighing a quantity of the adhesive into an extraction thimble, refluxing the adhesive for 5 to 8 hours with a solvent (e.g. 1,2-dichloroethane or tetrahydrofuran), drying the thimble in an oven for 24 hours to evaporate the solvent and, after leaving the dried thimble in the atmosphere for a further 24 hours reweighing the thimble. The gel content is then defined as the final weight of the adhesive (which is insoluble) expressed as a percentage of the initial weight of the adhesive.

The adhesive cures, as stated above, by reaction of a plurality of mutually reactive components. The phase "mutually reactive components" is defined herein as meaning components which, when mixed together in their particulate form, will react together at the fusion temperature thereof or at least at the highest fusion temperature thereof to form a composition having a $T_{80}$ value that is at least 20° C., preferably at least 30° C. and especially at least 40° C. above the initial fusion temperature of the blend. Preferably the components will exhibit a gel content of at least 20%.

According to another aspect, the invention provides a method of enclosing at least part of a substrate, which comprises:
(a) positioning thereon a dimensionally-recoverable article such that an adhesive composition is disposed between the article and substrate, the adhesive composition comprising a plurality of mutually reactive components that exist separately from one another in the form of solid particles which are mixed together and which will fuse when heated; and
(b) recovering the article about the substrate and heating the adhesive to fuse the particles.

There is essentially no limit on the particle size of the reactive components in that the articles can still show a synergistic increase in rate and/or level of cure even with very large particles although the absolute value of the cure rate will decrease with large particles. Preferably the reactive components will have a weight average particle size of not more than 1000, especially not more than 500 and most especially not more than 300 micrometers. Preferably the reactive components have a weight average particle size of at least 1, more preferably at least 5 and especially at least 10 micrometers. The particle size of the reactive components may conveniently be adjusted by sieving the particles through an appropriately sized mesh in which case it is preferred that the particulate components are substantially free of particles greater than 500 micrometers in size. The preferred particle size ranges are from 5 to 300 and especially 10 to 200 micrometers.

The adhesive composition may, if desired, consist solely of the reactive components although it is preferred for it to include one or more inert components. The inert components may be present with the reactive components in the particles, or may be mixed with the particles as a separate phase or both. For example, the adhesive may comprise a particulate curable resin such as an epoxy resin, preferably one based on bisphenol A or on epoxy novolak resin, as one component and a particulate curing agent such as an amine, carboxylic acid, phenolic resin or isocyanate curing agent as the other. The curing agent may itself be polymeric for example it may be a polyamide having free amino groups of a carboxylated polymer such as an acid terpolymer, in which case the particles of the curing agent need not contain any inert component. If the curing agent is not polymeric, for example, an organic peroxide or other free radical initiator, it may be desirable for it to be blended with a polymeric material, e.g. a polyester or a reactive or unreactive polyamide before comminution. The curable resin may, instead, comprise a polyamide having free amine groups, in which case the curing agent preferably comprises a material having free or blocked isocyanate functional groups, e.g. a cresyl blocked isocyanate.

The polyamides that are most suitable for forming one of the components are those that are conventionally used as hot-melt adhesives. These polyamides are characterized by the fact that their amide linkages are separated by an average of at least fifteen carbon atoms and have amorphous structures in contrast with the more hightly crystalline, fibre forming polyamides such as nylon 6 or nyon 6.6. The polyamides preferably have an amine number of at least 5, the upper limit for the amine number being determined by the fact that as the amine number increases the polyamides become liquid at lower temperatures.

Chemical curing accelerators may also be present in the adhesive, either blended with one of the reactive components or as separate particles. Examples of accelerators include dimethylaminopyridine, tris (dimethylaminomethyl) phenol, tin octoate, imidazole or imidazole derivatives such as salts, substituted imidazoles or metal complexes thereof.

A number of inert components may be incorporated in the compositions as long as they do not adversely affect the increase in rate or level of cure of the adhesive composition. Also it is preferred if they do not adversely affect the storage life of the adhesive.

Inert components that may be incorporated in the adhesive include plasticisers such as phthalates or rosin esters, thermoplastic or thermosetting polymers, cured or uncured rubbers, inorganic materials to modify the properties of the uncured or cured adhesive such as reinforcing fillers, reinforcing fibres or microspheres, or tackifiers and the like. The other components, whether organic or inorganic, may be in any appropriate physical form, for example they may be in the form of powder, flake or fibres, and are preferably present in an amount of from 5 to 50 percent by weight based on the total weight of the composition. In a preferred aspect of the invention the adhesive composition contains one or more other components having a softening temperature range (from the initial softening temperature to $T_{60}$) that is greater than that of the reactive components so that the softening temperature range of the adhesive composition as a whole is greater than that of the reactive components, preferably by at least 5° C. This has the advantage that, whilst the adhesive will cure when heated to only a relatively low temperature above the maximum storage temperature, it will possess cohesive and adhesive strength over a significantly greater temperature range. Alternatively, in some cases where the reactive components have a large softening temperature range it may be desirable to reduce the softening temperature range of the adhesive composition by incorporation of the appropriate components for example tackifier resins such as hydrogenated rosin esters and terpene phenols or polar waxes such as polyamide and polyester waxes.

As examples of other components that may be incorporated in the adhesive compositions, there may be mentioned tacky materials such as pressure sensitive adhesives or mastics, or thermoplastic materials. The components are preferably, although not necessarily, fluid at temperatures below the melting point of the reactive components, but if they are not they should be such as to allow the reactive components to mix together at the recovery temperature of the article.

The articles according to the invention may be formed in a number of configurations depending on the particular use. The articles may be in the form of a tube that has been extruded and expanded radially to render it heat-recoverable, the tube being either in continuous lengths or discrete pieces and being coated on its internal surface with the adhesive compositions. Alternatively, the articles may be in the form of a sheet or tape that can be wrapped or wound around an object. More complex shapes, commonly referred to as boots, transitions, udders or caps, may be formed by moulding the articles in the desired configuration and then expanding them or by the methods described in our copending U.K. Applications Nos. 8123069 and 8123072 (serial Nos. 2083403A and 2083859A). The present invention is also suitable for the production of wrap-around devices. So called wrap-around devices are employed for sealing, insulating or otherwise protecting a substrate where the use of a preformed tubular article such as a sleeve, it not possible or convenient e.g. in the case where the end of an elongate substrate is not accessible. In general, such wrap-around articles comprise at least a portion thereof which is adapted to be wrapped around a substrate to be covered and secured in tubular form by closure means. Thereafter, the wrap-around closure may be heat-recovered tightly onto the substrate by application of heat. Examples of wrap-around devices are described in U.S. Pat. Nos. 3,379,218, 3,530,898 and 3,542,079 the disclosures of which are incorporated herein by reference. Another form of wrap-around device in which the curable adhesive may be used is that described in U.K. Patent Application No. 8113486 (Ser. No. 2076694A) in which the curable adhesive is used to form a layer of sealant that may be peeled away at any desired point to expose a closure adhesive.

Another preferred article according to the invention is in the form of a continuous tape or sheet, one surface of which is coated with the adhesive composition. Such an article may be wound helically around a substrate for example a metal pipe which is preferably pre-heated, and the wound portions of the tape or sheet may be heated to recover the tape or sheet and cure the adhesive. Often is desired to operate further on the pipe shortly after the protective article has been recovered thereon, for example to bury it in a pre-dug trench and, because of the rapid cure of the adhesive composition, it is possible to perform such operations only a few minutes after the tape or sheet according to the invention has been recovered thereon.

The adhesive composition may be coated on the heat-recoverable article in a number of ways depending on the type of article and adhesive composition. For example, where the article has an open, generally uniform configuration, it may be provided with a layer of tacky material for example pressure sensitive adhesive layer e.g. by spraying or in the form of a tape, and the adhesive composition may be applied as a powder to the pressure sensitive adhesive bearing portions of the article and compressed thereon by application of pressure. Alternatively, the powder may be compressed into a coherent layer and then bonded to the article by means of a tacky material. For either of these methods, pressures in the order of 0.8 MPa (120 p.s.i.) and temperatures of about 15° to 30° C. have been found to be most suitable. These methods of applying the adhesive composition are suitable for applications in which the adhesive contains no components other than the particulate reactive components in addition to those in which the adhesive does contain other components. In another method of applying the adhesive composition, the particulate reactive components are mixed with the other components which preferably comprise or include a pressure-sensitive adhesive or a mastic and the whole composition is pressed onto the heat-recoverable article or pressed into a coherent film which is then adhered to the heat-recoverable article, the temperatures and pressures used preferably being the same as those mentioned above.

Yet another method of application, which is suitable for coating the internal surfaces of tubes or moulded articles, comprises spraying the adhesive onto the appropriate parts of the article. The adhesive may be sprayed in the form of the dry powder onto a surface that is coated with a tacky material, e.g. a pressure sensitive adhesive, or the particulate reactive components may be dispersed in a non-solvent that contains a binder and, after the dispersion is sprayed onto the article, the non-solvent is allowed to evaporate.

The following Examples illustrate the invention, all parts expressed therein being by weight:

EXAMPLE 1

20 Parts of a cryogenically ground dimerised fatty acid reactive polyamide sold under the trade name "Macromelt 6071" (formerly called "Versamid 871") ($T_i = 60°$ C.; $T_{60} = 67°$ C.) were mixed with 77 parts of a powdered epoxy resin based n bisphenol A sold under the trade name "DER 662" ($T_i = 47°$ C.; $T_{60} = 67°$ C.) and 3 parts of powdered dimethylaminopyridine accelerator ($T_{60} = 105°$ C.). The mixture was graded so that no particles were greater than 300 micrometers in size.

The composition was pressed onto a heat-shrinkable ethylene vinyl acetate sheet having a recovery temperature of 80° C. to an amount of 0.75 to 1 $kgm^{-2}$. The ethylene vinyl acetate sheet having a recovery temperature of 80° C. to an amount of 0.75 to 1 $kgm^{-2}$. The sheet had a recovery ratio of 3.75:1 and was wrapped around a mandrel that had been preheated to a predetermined temperature in an oven, and the edges of the sheet were secured. The mandrel and sheet had dimensions such that when the sheet recovered onto the mandrel it had recovered by 60% of its total possible recovery. The sheet and mandrel were placed in the oven and strips of the sheet and adhesive were removed after time intervals. As a comparison, samples of the adhesive were placed in a 1 mm thick bakelite pan and were heated in the oven for the same length of time. The comparison samples had a thickness of about 0.8 to 0.9 $kgm^{-2}$ (corresponding to the initial thickness of adhesive on the shrinkable sheet) and about 1.5 $kgm^{-2}$ (corresponding to the final thickness of the adhesive on the recovered sheet).

The extent of cure of the adhesive was measured as the gel content. The results are shown in Table I.

TABLE I

| | Oven Temperature = 100° C. | | |
|---|---|---|---|
| | Gel Content (%) | | |
| Time | | Comparison | |
| (minutes) | Heat Shrink | (0.8–0.9 $kgm^{-2}$) | (1.5 $kgm^{-2}$) |
| 0 | 0 | 0 | 0 |
| 5 | 27 | 15 | 18 |
| 10 | 25 | 17 | 15 |
| 15 | 26 | 20 | 18 |
| 20 | 39 | 23 | 24 |
| 30 | 68 | 42 | 56 |

EXAMPLE 2

An adhesive was prepared by blending 19 parts of a polyamide sold by Henkel under the trade name "Macromelt 6301" (formerly called Versalon 1300) with 19 parts of a reactive polyamide sold by Henkel under the trade name "Macromelt 6071" (formerly called Versamid 871) and the blend was cryogenically ground and sieved to a particle size of less than 300 micrometers. The $T_{60}$ melting point was 73° C. To the polyamide was added 60 parts of a bisphenol A epoxy resin sold by Shell Chemicals under the trade name "Epikote 1001" (ground and sieved to a particle size of less than 300 microns) ($T_{60} = 50$–70° C.), 2.5 parts of powdered dimethylaminopyridine and 0.3 parts of a silica flow agent.

The adhesive was coated onto a heat-shrinkable crosslinked ethylene vinyl acetate sheet (Elvax 460 - trade name) having a recovery temperature of 80° C. and a recovery ratio of 16%, to an amount of 0.75 to 1 $kgm^{-2}$. The curing of the adhesive and of comparison samples was observed by the procedure described in Example 1, and the results are shown in table II, comparison A and B samples having an adhesive thickness of 0.8–0.9 $kgm^{-2}$ and 1.5 $kgm^{-2}$ respectively.

TABLE II

| | GEL CONTENT (%) | | | | | |
|---|---|---|---|---|---|---|
| | Oven Temperature | | | | | |
| | 80° C. | | | 120° C. | | |
| | Heat | Comparison | | Heat | Comparison | |
| Time (Minutes) | Shrink | A | B | Shrink | A | B |
| 0 | 8 | 8 | 8 | 8 | 8 | 8 |
| 5 | 16 | 7 | 5 | 82 | 12 | 7 |
| 10 | 20 | 7 | 18 | 85 | 13 | 7 |
| 15 | 24 | 10 | 16 | 79 | 50 | 50 |
| 20 | 22 | 10 | 34 | 78 | 57 | 57 |
| 30 | 42 | 10 | 30 | 84 | 58 | 66 |

EXAMPLE 3

An adhesive was prepared by mixing the following particulate components:

| | | $T_i$ | $T_{60}$ | Parts by weight |
|---|---|---|---|---|
| (a) | Polyamide sold under the trade name Macromelt 6301 modified by milling in 10% by weight of a plasticiser sold under the trade name "santicizer 8" by Monsanto | 45° C. | 80° C. | 9 |
| (b) | Macromelt 6301 polyamide modified by milling in 10% by weight of a polymercaptan sold by Diamond Shamrock under the trade name Capcure 3-800" | 70° C. | 84° C. | 9 |
| (c) | Epoxy cresyl novolak resin sold under the trade | 42° C. | 67° C. | 59 |

| | $T_i$ | $T_{60}$ | Parts by weight |
|---|---|---|---|
| name "ECN 1280" by CIBA GEIGY | | | |
| (d) dimethylaminopyridine (accelerator) | | 105° C. | 3 |
| (e) Talc | | | 20 |

The composition was graded to exclude particles greater than 300 micrometers and pressed onto a heat-shrinkable sheet as described in Example 1. Curing of the adhesive was observed by the procedure described in Example 1 and the results are shown in Table III.

TABLE III

Oven temperature = 140° C.

Gel Content (%)

| | | Comparison | |
|---|---|---|---|
| Time | Heat Shrink | (0.8–0.9 kgm$^{-2}$) | (1.5 kgm$^{-2}$) |
| 0 | 0 | 0 | 0 |
| 5 | 51 | 35 | 24 |
| 10 | 50 | 42 | 36 |
| 15 | 55 | 52 | 48 |
| 20 | 49 | 56 | 48 |
| 30 | 57 | 55 | 56 |

EXAMPLE 4

50 parts of a cryogenically ground reactive polyamide sold under the trade name "Macromelt 6071" ($T_i$=52° C.; $T_{60}$=72° C.) were mixed with 50 parts of a powdered blocked isocyanate sold by Mobay Chemical Co. under the trade name "Mondur SH" ($T_{60}$=97° C.) to form an adhesive composition. The procedure of Example 1 was repeated with the exception that the extent of cure of the adhesive was determined by measuring the $T_{80}$ value of the samples of the adhesive after removal from the oven and that an aluminum pan was used for the comparison samples. The results are shown in Table IV.

TABLE IV $T_{80}$/°C. (Oven temperature = 120° C.)

| TIME (Minutes) | Heat Shrink | Comparison (1.5 kgm$^{-2}$) |
|---|---|---|
| 0 | 88 | 88 |
| 5 | 97,99 | |
| 10 | 121,123 | |
| 15 | 120,119 | 118 |
| 20 | 136,155 | 116,126 |
| 30 | 205,172 | 109,180 |

EXAMPLE 5

150 parts of Macromelt 6301 polyamide that had been modified by milling in 5% by weight of a reactive liquid polyamide sold under the trade name Euredor 115 (formerly called Versamid 115) and had been cryogenically ground to form a powder ($T_{60}$=74° C.) were mixed with 100 parts of a powdered ethylene-vinyl acetate-acid terpolymer sold by du Pont under the trade name Elvax 4260, 80 parts of a bisphenol A epoxy resin sold by Shell Chemicals under the type No. Epikote 1004 ($T_{60}$=80°–100° C.), and 6 parts of a dimethylaminopyridine accelerator. Each of the components had been sieved to remove all particles greater than 300 micrometers in size.

The adhesive was applied onto a heat-shrinkable sheet and cured as described in Example 1, the curing being measured by the $T_{80}$ value of the adhesive. The oven temperature was of 120° C. The results are shown in Table V.

TABLE V $T_{80}$/°C.

| | | Comparison | |
|---|---|---|---|
| Time (minutes) | Heat Shrink | (0.8–0.9 kgm$^{-2}$) | (1.5 kgm$^{-2}$) |
| 5 | 94 | | 100 |
| 10 | • | | 98 |
| 15 | 107 | 84 | |
| 20 | 116 | 109 | 96 |
| 30 | 118 | | 93 |

EXAMPLE 6

An adhesive was prepared by blending 48 parts of a reactive polyamide (Macromelt 6071) with 3 parts dimethylaminopyridine, then cryogenically grinding the blend to form a powder and sieving the powder to a particle size of less than 300 micrometers. To this were added 34 parts of a powdered multifunctional epoxy cresyl novolak resin sold by Dow Chemicals under the trade name "XD 7855" ($T_{60}$=69°–77° C., particle size less than 300 microns), 10 parts of powdered decabromo diphenyl ether (flame retardant) and 5 parts antimony trioxide.

The adhesive was applied onto a heat-shrinkable article and its curing measured as described in Example 1 at an oven temperature of 140° C. with the exception that an aluminum pan was used for the comparison samples. The results are shown in Table VI.

TABLE VI

Gel Content (%)

| Time (Minutes) | Heat Shrink | Comparison (1.5 kgm$^{-2}$) |
|---|---|---|
| 0 | 15 | 15 |
| 5 | 35 | 19 |
| 10 | 43 | 20 |
| 15 | 46 | 23 |
| 20 | 50 | 24 |
| 30 | 54 | 27 |

EXAMPLE 7

Example 4 was repeated with the exception that the 50 parts of polyamide (Macromelt 6071) were replaced by 50 parts of a difunctional bisphenol A epoxy resin sold by Shell Chemicals under the trade name "Epikote 1001" ($T_{60}$=50°–70° C.). The oven temperature was 140° C. and the $T_{80}$ values are shown in Table VIII.

TABLE VII $T_{80}$/°C.

| Time (Minutes) | Heat Shrink | Comparison (1.5 kgm$^{-2}$) |
|---|---|---|
| 0 | 85 | 85 |
| 5 | 100 | 91 |
| 10 | 107 | 83 |
| 15 | 109 | 96 |
| 20 | 107 | 82 |
| 30 | 106 | 86 |

EXAMPLE 8

Example 1 was repeated using, as the adhesive, a commercially available powdered phenolic resin (melting point 80° C.) which included 9% by weight of powdered hexamethylene tetramine as the curing agent (sublimation temperature 150° C.). The rate of curing was determined by gel content and the results are shown in Table VIII.

TABLE VIII

| Time (Minutes) | Gel content (%) | | |
|---|---|---|---|
| | Heat shrink | Comparison | |
| | | $(0.8-0.9\ kgm^{-2})$ | $(1.5\ kgm^{-2})$ |
| 0 | 13 | | |
| 5 | 9 | 9 | 9 |
| 10 | 50 | 9 | 5 |
| 15 | 84 | 8 | 6 |
| 20 | 108 | 15 | 8 |
| 30 | 112 | 83 | 71 |

EXAMPLE 9

Example 4 was repeated using an adhesive comprising 60 parts by weight of a particulate epoxy resin (either GT 7004 or Araldite 6100 sold by CIBA GEIGY), 40 parts of a particulate bisphenol A novolak resin sold by CIBA GEIGY under the trade name XD4049, and 2 parts dimethylaminopyridine.

We claim:

1. A dimensionally heat-recoverable polymeric article having, on at least part of a surface thereof, an adhesive composition that in use is disposed between the article and a substrate onto which the article is to be recovered and that, on recovery of the article, cures by reaction of a plurality of mutually reactive components, the components each having a fusion temperature within the range from 50° to 120° C. and existing separately from one another in the form of solid particles which are mixed together so that the adhesive composition remains substantially uncured during storage of the article and which fuse to bring about curing when the article is heated to recover it onto the substrate.

2. An article as claimed in claim 1, which is in the form of a tube and is coated with the adhesive composition on at least part of its inner surface.

3. An article as claimed in claim 1, which is in the form of a sheet and is coated with the adhesive on at least part of one surface thereof.

4. An article as claimed in claim 1, wherein each of the reactive components has a fusion temperature in the range of from 70° to 120° C.

5. An article as claimed in claim 1, wherein each of the reactive components has a fusion temperature that differs from the fusion temperature of the or each other reactive components by not more than 30° C.

6. An article as claimed in claim 1, wherein one of the reactive components comprises an epoxy resin and the other reactive component comprises a thermoplastic polyamide resin having free amine groups.

7. An article as claimed in claim 1, wherein the adhesive includes one or more non-reactive components.

8. An article as claimed in claim 1, wherein each of the reactive components has a fusion temperature that is not more than 50° C. above the recovery temperature of the article.

9. An article as claimed in claim 3, wherein each of the reactive components has a fusion temperature that is not more than 10° C. above the recovery temperature of the article.

10. An article as claimed in claim 1, wherein at least one of the components has a softening temperature range from an initial softening temperature to its fusion temperature which is not more than 30° C.

11. An article as claimed in claim 10, wherein the adhesive composition includes one or more non-reactive components and has a softening temperature range that is greater than the softening temperature range of the reactive components.

12. An article as claimed in claim 1, wherein the particles have a weight average particle size of not more than 1000 micrometers.

13. An article as claimed in claim 12, wherein the particles have a weight average particle size of not more than 300 micrometers.

14. A method of enclosing at least part of a substrate, which comprises:
(a) positioning thereon a dimensionally heat-recoverable polymeric article, such that an adhesive composition is disposed between the article and the substrate, the adhesive composition comprising a plurality of mutually reactive components that each have a fusion temperature within the range from 50° to 120° C. and that exist separately from one another in the form of solid particles which are mixed together so that the adhesive composition remains substantialy uncured during storage of the article and which fuse to bring about curing when the article is heated to recover it onto the substrate, and
(b) heating the article to recover it about the substrate and to fuse the particles of the adhesive.

* * * * *

UNITED STATES PATENT AND TRADEMARK OFFICE
CERTIFICATE OF CORRECTION

PATENT NO. : 4,707,388

DATED : November 17, 1987

INVENTOR(S) : Park, et al.

It is certified that error appears in the above-identified patent and that said Letters Patent is hereby corrected as shown below:

The Title should be changed from Heat-Recoverable Article to "Dimensionally-Recoverable Article".

Col. 1, line 62, correct the spelling of bcome to "become".

Col. 3, line 43, after plot delete the parenthesis.

Col. 6, line 22, after sleeve, delete "it" and insert "is".

Col. 7, line 40, delete "ethylene vinyl acetate sheet having a recovery temperature of 80°C to an amount of 0.75 to 1 $kgm^{-2}$. The".

Col. 11, line 35, after "article" insert "having a recovery temperature of about 100 to 120°C and".

Signed and Sealed this

Thirty-first Day of July, 1990

*Attest:*

HARRY F. MANBECK, JR.

*Attesting Officer*  *Commissioner of Patents and Trademarks*